(12) United States Patent
Jamadagni et al.

(10) Patent No.: US 12,127,298 B2
(45) Date of Patent: *Oct. 22, 2024

(54) METHOD AND SYSTEM FOR SENSOR DATA TYPE IDENTIFICATION IN A NB-IoT NETWORK

(71) Applicant: Jio Platforms Limited, Gujarat (IN)

(72) Inventors: Satish Jamadagni, Bangalore (IN); Vinay Kumar Shrivastava, Bangalore (IN); Mahesh Nayaka Mysore Annaiah, Bangalore (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 38 days.

This patent is subject to a terminal disclaimer.

(21) Appl. No.: 17/929,543

(22) Filed: Sep. 2, 2022

(65) Prior Publication Data
US 2022/0417725 A1 Dec. 29, 2022

Related U.S. Application Data

(63) Continuation of application No. 16/789,163, filed on Feb. 12, 2020, now Pat. No. 11,477,635.

(30) Foreign Application Priority Data

Feb. 12, 2019 (IN) .............................. 201921005444

(51) Int. Cl.
*H04W 8/08* (2009.01)
*H04W 4/70* (2018.01)
*H04W 8/24* (2009.01)

(52) U.S. Cl.
CPC ............... *H04W 8/08* (2013.01); *H04W 4/70* (2018.02); *H04W 8/24* (2013.01)

(58) Field of Classification Search
None
See application file for complete search history.

(56) References Cited

U.S. PATENT DOCUMENTS

2012/0015684 A1 1/2012 Noji
2013/0042011 A1 2/2013 Sugizaki
(Continued)

OTHER PUBLICATIONS

3GPP TS 36.306 V14.0.0 (Sep. 2016), p. 15 (Year: 2016).*

*Primary Examiner* — German Viana Di Prisco
(74) *Attorney, Agent, or Firm* — FINNEGAN, HENDERSON, FARABOW, GARRETT & DUNNER, LLP

(57) ABSTRACT

Embodiments of the present disclosure relate to system and method for identifying at least one sensor on at least one user equipment [200] connected to a wireless network, comprising the a mobile management entity (MME) [101] transmitting an initial context setup request for at least one user equipment [200] to a network entity [300] of the wireless network. Next, the network entity [300] transmits a capability enquiry to the at least one user equipment [200] based on the initial context setup request received from the MME [101]. The network entity [300] receives a capability information from the at least one user equipment [200] in response to the capability enquiry, wherein the capability information comprises of sensor capability information of the at least one user equipment [200]. Thereafter, the network entity [300] transmits the capability information of the at least one user equipment [200] to the MME [101].

15 Claims, 12 Drawing Sheets

(56) References Cited

U.S. PATENT DOCUMENTS

| | | | |
|---|---|---|---|
| 2013/0159522 A1* | 6/2013 | Hakola | H04L 63/0281 |
| | | | 709/225 |
| 2014/0087695 A1 | 3/2014 | Hjelm | |
| 2015/0195864 A1 | 7/2015 | Bartolome Rodrigo | |
| 2015/0327107 A1 | 11/2015 | Kim | |
| 2016/0234645 A1 | 8/2016 | Belghoul | |
| 2016/0330770 A1* | 11/2016 | Lee | G16H 50/30 |
| 2018/0027404 A1 | 1/2018 | Delos Reyes | |
| 2018/0160298 A1* | 6/2018 | Wang | H04M 7/006 |
| 2018/0376417 A1 | 12/2018 | Wang | |
| 2019/0020998 A1 | 1/2019 | Takahashi | |
| 2019/0166453 A1 | 5/2019 | Edge | |
| 2019/0313239 A1 | 10/2019 | Horn | |
| 2020/0077361 A1 | 3/2020 | Huang | |
| 2020/0120479 A1 | 4/2020 | Ryden | |
| 2021/0092590 A1 | 3/2021 | Hong | |
| 2021/0100001 A1* | 4/2021 | Höglund | H04L 5/0053 |
| 2022/0117014 A1* | 4/2022 | Zhang | H04W 4/70 |

* cited by examiner

METHOD AND SYSTEM FOR SENSOR DATA TYPE IDENTIFICATION IN A NB-IoT NETWORK

TECHNICAL FIELD

The present invention relates to the technical field of wireless communication. More particularly, the present invention relates to a switching mechanism between CAT-Narrow Band (NB) channel to CAT-1/4 for emergency service.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The Internet of Things (IoT) is a network of devices, vehicles, home appliances, and other items embedded with electronics, software, sensors, actuators, and connectivity which can be readable, recognizable, locatable, addressable, and controllable via an IoT communications network that enables these things to connect and exchange data, creating opportunities for more direct integration of the physical world into computer-based systems, resulting in efficiency improvements, economic benefits, and reduced human exertions. The "Internet of things" (IoT) concept is getting more and more popular, and devices, such as sensors, actuators and everyday objects including the coffee makers, washing machines, headphones, lamps and wearable devices, etc. are being increasingly looked upon as potential IoT devices. IoT involves extending Internet connectivity beyond standard devices, such as desktops, laptops, smartphones and tablets, to any range of traditionally dumb or non-internet-enabled physical devices and everyday objects. Embedded with technology, these devices can communicate and interact over the Internet, and they can be remotely monitored and controlled. The term "Enterprise IoT" refers to devices used in business and corporate settings in a network of physical objects that contain embedded technology to communicate and sense or interact with their internal states or the external environment. Here, IoT refers to Internet-connected physical devices, in many cases everyday objects (things) that can communicate their status, respond to events, or even act autonomously. This enables communication among those things, closing the gap between the real and the virtual world and creating smarter processes and structures that can support us without needing our attention. IoT has evolved from the convergence of wireless technologies, micro-electromechanical systems (MEMS), and the Internet. An IoT device is generally provisioned with an IP address to provide it with the capability of transferring data and receive control signals over an IP network using the standard Internet protocols such as TCP/IP which is being exclusively used on the Internet.

An IoT device is generally provisioned with an IP address to provide it with the capability of transferring data and receive control signals over an IP network using the standard Internet protocols such as TCP/IP which is being used on the Internet.

Recently, 3GPP has introduced a new technology NB-IoT in release 13. The low-end IoT applications can be met with this technology. This technology has better performance than Low Power Wide Area Networks (LP-WAN). It has taken efforts to address IoT markets with completion of standardization on NB-IoT. The NB-IoT technology has been implemented in licensed bands of LTE, which are used for exploiting this technology. This technology makes use of a minimum system bandwidth of 180 kHz i.e. one PRB (Physical Resource Block) is allocated for this technology. The NB-IoT can be seen as a separate RAT (Radio Access Technology).

The NB-IoT can be deployed in 3 modes: "in-band", "guard band" and "standalone". In the "in-band" operation, resource blocks present within LTE carrier are used. The inner resource blocks are not used as they are allotted for synchronization of LTE signals. In "guard band" operation, resource blocks between LTE carriers that are not utilized by any operator are used. In "standalone" operation, GSM frequencies are used, or possibly unused LTE bands are used. Release 13 contains important refinements like extended or enhanced discontinuous reception (eDRX) and power save mode (PSM). The PSM ensures battery longevity in release 12 and is completed by eDRX for devices that need to receive data more frequently.

The NB-IoT technology focuses on devices like meter reading of water and electricity consumption that are stationery. Some of the use cases are facility management services, fire alarms for home and commercial properties, tracking of persons and objects. The industries where NB-IoT services can add value are Smart city, smart home, safety and security, agriculture, health care and Energy. Another example for IoT industry includes logistic tracking. The tracking devices on shipping containers send huge volumes of sensor data that are collected and taken for analysis in order to make sure that real-time tracking of shipment locations can be made possible. The output display units are used for receiving alerts and optimized with service recommendations.

The NB-IoT technology addresses some of the key IoT requirements, including, but not limited to, battery lifetime of the devices increases, improved network coverage, cost of the devices is reduced, multiplexing of devices met for capacity requirements, support a massive number of devices, low power consumption, use of low-cost devices, providing excellent coverage.

In an NB-IoT deployment, the NB-IoT cells have a 20 db gain over other categories like CAT-1 cells. As such, the NB-IoT Carrier can support much larger areas when compared to a CAT-1 base station or channel. Typically, in NB-IOT scenario, the same base station provides the NB-IoT channels for a device. The same or a different base station can provide a channel for a CAT-1 or a CAT-4 operation due to the difference in the NB-IoT and other category cell coverage areas.

As huge number of IoT devices are connected, and as businesses use applications to parse IoT data from different sensors available at a user device, optimization is a real challenge to serve a host of sensors. Even though NB-IoT is expected to serve a vast types of sensors, the overall design of NB-IoT is akin to an access system and is not optimized to serve a host of sensors which varies based on the nature of data, periodicity of data transmission, latency sensitivities etc.

Further, when it comes to IoT ecosystem development, optimization to serve a host of sensors is a tedious process and often time-taking in the chain of operation involved in NB-IoT network. A major challenge in hosting variety of seniors in NB-IoT is to enable a fast connection in an optimized way to efficiently manage the NB-IoT sensor data received from user devices connected to the NB-IoT network. Also as the numbers grows for the IoT devices in future there needs to be an efficient architecture to handle different such use cases.

The existing solutions in the field of NB-IoT fail to disclose identifying various sensors (of a different type) present at a user device and to introduce these sensors into the network architecture and thus, fail to achieve a close integration of the different sensor type available at a user device and the NB-IoT network. Thus, there is a need in the art for a system and method that support to bring in awareness of sensor type into the network architecture and thus helping achieve a close integration of the sensor type and the NB-IoT network. This disclosure provides system and method that is aware of the sensor type, can dynamically add new sensor types and control the sensor data transmission by configuring the collection and rate of data transmission via a control channel.

Therefore, in view of the above shortcomings in the existing approaches, there is a need in the art to provide an efficient solution for identifying at least one sensor on a user equipment connected to a wireless network.

SUMMARY

This section is provided to introduce certain objects and aspects of the present disclosure in a simplified form that are further described below in the detailed description. This summary is not intended to identify the key features or the scope of the claimed subject matter.

In order to overcome at least a few problems associated with the known solutions as provided in the previous section, an object of the present invention is to provide a system and method for identifying at least one sensor on at least one user equipment connected to a wireless network. Another object of the present disclosure is to provide a system and a method to provide awareness of sensor type into the network architecture and thus helping achieve a close integration of the sensor type and the NB-IoT network. Yet another object of the present disclosure is to provide a system and a method to dynamically add new sensor types and control the sensor data transmission by configuring the collection and rate of data transmission via a control channel. Yet another object of the present disclosure is to provide a system and a method to reduce the design complexity of radio with a single antenna in order to reduce the cost for such radio technologies. Yet another object of the present disclosure is to provide improved range and obstacle penetration along with simplified radio design, such that NB-IoT has higher signal strength in comparison to other cellular technologies, resulting in improved coverage for NB-IoT signals.

In order to achieve at least some of the above-mentioned objectives, the present disclosure provides a method and system for identifying at least one sensor on at least one user equipment connected to a wireless network. A first aspect of the present invention relates to a method for identifying at least one sensor on at least one user equipment connected to a wireless network. The method comprising transmitting, by a mobile management entity (MME), an initial context setup request for at least one user equipment, to a network entity of the wireless network. Subsequently, the network entity of the wireless network transmits a capability enquiry to the at least one user equipment based on the initial context setup request received from the MME. Next, the network entity receives a capability information from the at least one user equipment in response to the capability enquiry received from the network entity, wherein the capability information comprises of sensor capability information of the at least one user equipment. Thereafter, the network entity transmits the capability information of the at least one user equipment to the MME.

Another aspect of the present disclosure relates to a system for identifying at least one sensor on at least one user equipment connected to a wireless network. The system comprises a mobile management entity (MME), at least one user equipment and a network entity of the wireless network. The MME is connected to the wireless network, said MME configured to transmit an initial context setup request for at least one user equipment, to a network entity of the wireless network. The network entity of the wireless network is connected to the MME, said network entity configured to receive, from the MME, an initial context setup request for the at least one user equipment. The network entity is also configured to transmit, to the at least one user equipment, a capability enquiry based on at least the initial context setup request received from the MME. The at least one user equipment is connected to the network entity of the wireless network, said at least one user equipment configured to receive a capability enquiry from the network entity of the wireless network. The at least one user equipment is also configured to transmit, to the network entity, a capability information of the at least one user equipment in response to the capability enquiry received from the network entity, wherein the capability information comprises of sensor capability information. The network entity of the wireless network is also configured to transmit the capability information of the at least one user equipment to the MME.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the disclosure, but the possible variants of the method and system according to the disclosure are illustrated herein to highlight the advantages of the invention. It will be appreciated by those skilled in the art that disclosure of such drawings includes disclosure of electrical components or circuitry commonly used to implement such components.

Figure 1:
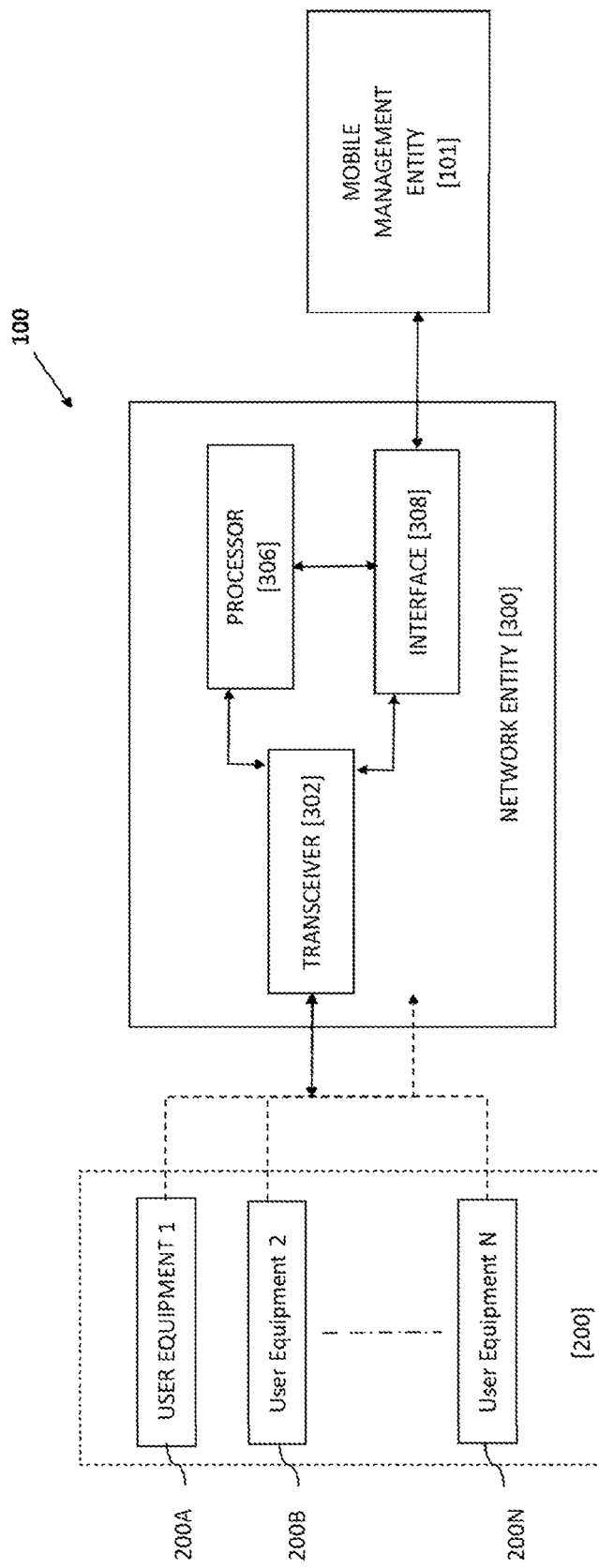
FIG. 1 illustrates a general overview of the network environment [100] in which the present invention is implemented, in accordance with exemplary embodiments of the present disclosure.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

As used herein, the "IoT device" or "user equipment", refers to any electrical, electronic, electromechanical and computing device. The IoT device is capable of receiving and/or transmitting one or parameters, performing function/s, communicating with other IoT devices as well as non-IoT devices and transmitting data to the devices. The IoT device may have a processor, a display, a memory unit, a battery and an input-means such as a hard keypad and/or a soft keypad. The at least one IoT device may include, but is not limited to, a thermostat, an electric switch, a washing machine, a computing device, a coffee maker, a refrigerator, a headphone, a lamp, a room sensor, a microwave, a fan, a light and any such device that is obvious to a person skilled in the art. IoT devices may be capable of operating on any radio access technology including but not limited to IP-enabled communication, Zig Bee, Bluetooth, Bluetooth Low Energy, Near Field Communication, Z-Wave, etc.

As used herein, a "processor" or "processor" includes at least one processors, wherein processor refers to any logic circuitry for processing instructions. A processor may be a general-purpose processor, a special-purpose processor, a conventional processor, a digital signal processor, a plurality of microprocessors, at least one microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processor is a hardware processor.

As used herein, a "controller" or "control unit" includes at least one controllers, wherein the controller refers to any logic circuitry for processing instructions. A controller may be a general-purpose controller, a special-purpose controller, a conventional controller, a digital signal controller, a plurality of microcontrollers, at least one microcontrollers in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor.

As used herein, "memory unit" refers to a machine or computer-readable medium including any mechanism for storing information in a form readable by a computer or similar machine. For example, a computer-readable medium includes read-only memory unit ("ROM"), random access memory unit ("RAM"), magnetic disk storage media, optical storage media, flash memory unit devices or other types of machine-accessible storage media.

Systems depicted in some of the figures may be provided in various configurations. In some embodiments, the systems may be configured as a distributed system where at least one components of the system are distributed across at least one networks in a cloud computing system.

The present disclosure provides a system and a method for identifying at least one sensor on at least one user equipment [200] connected to a wireless network, in order to achieve a close integration of the different sensor type available at a user equipment and the NB-IoT network. Resultantly, new sensor types may be added in an efficient way at the NB-IoT network, and the NB-IoT network can also control the data transmission of the various sensor types by configuring the collection and rate of data transmission via a control channel.

As used herein, the "wireless network" may include, but not limited to any private or public wireless LTE network that may be presently implemented or deployed, and any wireless LTE network that may be deployed in the future. The wireless network may also be a later or newer technology of wireless LTE network, for example, LTE, LTE-A, LTE-B, LTE-C, voice over LTE etc. or any other such wireless LTE network technology obvious to a person skilled in the art. The wireless network is capable of providing one of a long-range and short-range wireless communication.

As used herein, a "network entity" is an entity that serves a cellular network for providing voice services (calls) and the data services to the user equipment. The network entity may include, but not limited to, a base station controller, a base transceiver station, a cell site, a Node B, an eNodeB, a radio network controller, and any such entity obvious to a person skilled in the art.

Referring to FIG. 1, illustrates a general architecture of the network environment [100] in which the present invention is implemented, in accordance with exemplary embodiments of the present disclosure. The environment comprises at least one user equipment ([200A], [200B], [200C] . . . [200N], collectively referred to as "200") connected to at least one wireless network entity [300]. In an instance, the present invention encompasses that the wireless network is an NB-IoT network and, accordingly, the network entity [300] of the wireless network is an eNodeB (eNB).

The mobile management entity (MME) [101] is connected to the wireless network. The MME [101] is configured to transmit an initial context setup request for at least one user equipment [200], to a network entity [300] of the wireless network.

The MME [101] is configured to receive, from the network entity [300] of the wireless network, a capability information of the at least one user equipment [200], wherein the capability information comprises of sensor capability information of the at least one user equipment [200]. In an instance, the present invention encompasses that the at least one user equipment [200] provides a list of at least one sensor available at the at least one user equipment [200] in the sensor capability information. For example, the present invention encompasses that for a pressure sensor and an inertial measurement unit (IMU) present at the at least one user equipment [200], the at least one user equipment [200] may indicate an ALTITUDE MEASUREMENT capability and a DISTANCE MEASUREMENT capability in the sensor capability information.

Subsequently, the MME [101] is configured to transmit, to the at least one user equipment [200], a request for information for the at least one sensor of the at least one user equipment [200] via the network entity [300] of the wireless network. The request for information is based on the sensor capability information received from the network entity [300] of the wireless network.

The MME [101] is also configured to receive one or more status parameters for the at least one sensor of the at least one user equipment [200], from the at least one user equipment [200] via the network entity [300] of the wireless network, in response to the request for information. For example, if the sensor capability information indicates that an accelerometer and a gyroscope are present at the user equipment [200], the MME [10] may send a request, to the user equipment [200] to provide information regarding acceleration and direction of the user equipment.

The wireless network entity [300] may further comprise a transceiver [302], a processor [306] and an interface [308]. The wireless network entity [300] may provide network access to the at least one user equipment [200] connected to the wireless network entity [300]. The wireless network entity [300] is also capable of provisioning and supporting NB-IoT RAT to the user equipment [200] via at least one access points such as an IoT gateway.

The processor [306] may be configured to execute functions/operations performed by each module/component of the wireless network entity [300]. The processor [306] as used herein may include, but not limited to, a processor or set of processors such as a microprocessor, a multi-core microprocessor, a digital signal processor, a collection of electronic circuits, or a combination thereof and may be configured to perform operations/functions as described herein.

Further the transceiver [302] coupled to said processor [306] may include at least one transmission unit and at least one receiving unit and the transceiver [302] may be configured to transmit or receive the communication signals/data via the wireless network entity [300] to user equipment [200] or vice versa. The interface [308] may be coupled to the transceiver [302] and processor [306] and the interface [308] may be configured for backhaul and to further reach out to an on-boarding server for information exchange.

The network entity [300] of the wireless network is connected to the MME [101]. For instance, the present invention encompasses that the network entity [300] is an eNodeB. The network entity [300] of the wireless network is configured to receive, from the MME [101], an initial context setup request for the at least one user equipment [200].

The network entity [300] of the wireless network is also configured to transmit, to the at least one user equipment [200], a capability enquiry based on at least the initial context setup request received from the MME [101]. The present invention encompasses that the network entity [300]

processes the initial context request to create a capability enquiry for the at least one user equipment [200].

The network entity [300] of the wireless network is also configured to receive a capability information from the at least one user equipment [200] in response to the capability enquiry received from the network entity [300] of the wireless network, wherein the capability information comprises of sensor capability information of the at least one user equipment [200]. In an instance of the present invention, the network entity [300] of the wireless network is further configured to receive a radio capability information from the at least one user equipment [200] in response to the capability enquiry received from the network entity [300] of the wireless network.

The network entity [300] of the wireless network is also configured to route a request for information for the at least one sensor identified at the at least one user equipment [200] from the MME [101] to the at least one user equipment [200]. The request for information is based on the sensor capability information received from the network entity [300] of the wireless network. Accordingly, the user equipment is configured to route one or more status parameters of the at least one sensor of the at least one user equipment [200], from the at least one user equipment [200] to the MME [101], in response to the request for information. The network entity [300] is described in further detail below with reference to FIG. 3.

Further the user equipment [200] may be an NB-IoT device and may include, but not limited to, a mobile phone, a tablet, a phablet, a laptop, a desktop computer, a personal digital assistant (PDA), a consumer electronics device such as meter, television etc. and said user equipment [200] may be configured to receive at least one of a data or voice service from the wireless network entity [300].

The user equipment [200] is connected to the network entity [300] of the wireless network. The user equipment is configured to receive a capability enquiry from the network entity [300] of the wireless network. Accordingly, in response to the capability enquiry received from the network entity [300] of the wireless network, the user equipment [200] is configured to transmit a capability information to the network entity [300] of the wireless network. The capability information comprises of sensor capability information of the at least one user equipment [200]. In another instance of the present invention, the capability information may further comprise of a radio capability information of the user equipment [200].

In an instance of the present invention, the user equipment [200] may identify one or more types of sensors available at the user equipment [200] in response to the capability enquiry received from the network entity [300] For example, the user equipment [200] may categorise the at least one sensor at the user equipment [200], based on the mobility needs of the at least one sensor, as one of a stationary sensor, a nomadic sensor, a low mobile sensor and a full mobile sensor.

In another example, the user equipment [200] may categorise the one ore more sensors at the user equipment [200], based on the application scenarios or different industrial verticals of the at least one sensor, as one of an agriculture sensor (Soil sensors, NPK sensors etc.), an environment monitoring sensor (weather sensors, wind force and direction sensors, moisture sensors etc.), etc. The present in-invention further encompasses that the sensor type can be either predefined, or obtained by the capability information message or may also be obtained via the application server.

In yet another instance of the present invention, the capability information of the user equipment may also include the frequencies supported by the user equipment. For example, the capability information may include that the user equipment supports very specific frequencies (Ex: Band 3 or Band 5 only).

The user equipment is also configured to receive a request for information for the at least one sensor of the at least one user equipment [200] from the MME [101] via the network entity [300] of the wireless network. The request for information being based on the sensor capability information received from the network entity [300] of the wireless network. Accordingly, in response to the request for information received from the network entity [300] of the wireless network, the user equipment [200] is configured to one or more status parameters for the at least one sensor of the user equipment [200] via the network entity [300] of the wireless network to the MME, in response to the request for information.

For example, if the sensor capability information indicates that an accelerometer and a gyroscope are present at the user equipment [200], the MME [10] may send a request, to the user equipment [200] to provide information regarding acceleration and direction of the user equipment. Accordingly, the user equipment [200] may provide measurement report containing readings from such sensors. The user equipment [200] is described in further detail below with reference to FIG. 2.

In another instance of the present invention, the MME [101] is further configured to receive the sensor capability information for the at least one user equipment [200] connected to the wireless network from an application server. For instance, the present invention provides that the applications server possesses a capability to define new sensor types and the associated data types and its periodicity in an NB-IoT system. The new sensor may be defined by the IoT application server via a subscription mechanism. The said mechanism involves, data being exchanged on the control chain data path and not on the regular data path, which in turn allows for faster data accessibility at the IoT application server and thus, result in getting rid of the overhead of setting up a separate data path. This instance of the present invention is described in further detail with reference to FIG. 6.

Although a limited number of user equipment [200] are shown in FIG. 1, however, it will be appreciated by those skilled in the art that the invention encompasses the use of multiple such user equipment [200].

Figure 2:
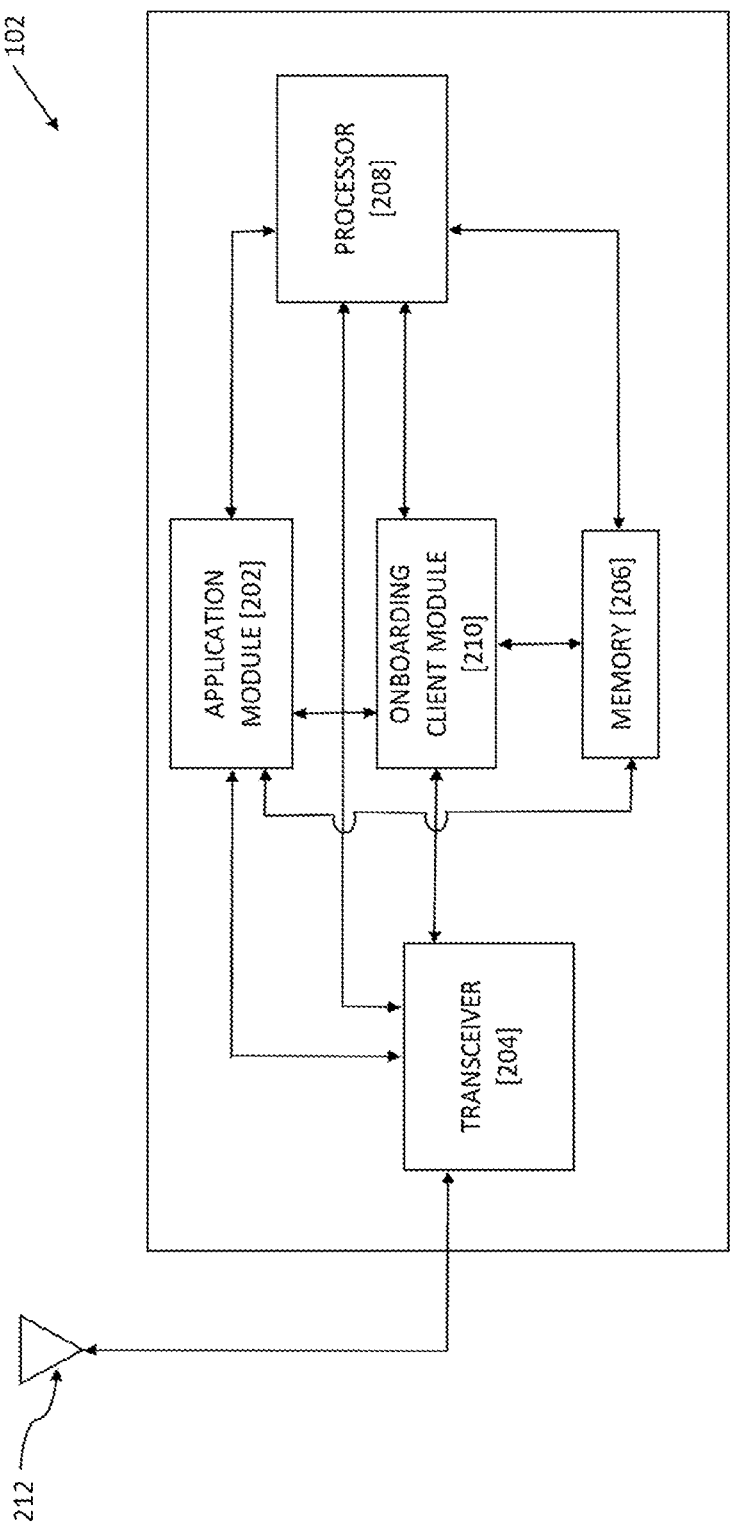
FIG. 2 illustrates an exemplary block diagram of a user equipment [200], in accordance with exemplary embodiments of the present disclosure.

As illustrated in FIG. 2, the present invention illustrates an exemplary block diagram of a user equipment [200], in accordance with exemplary embodiments of the present disclosure. The user equipment [200] comprises at least one application module [202], at least one transceiver [204], at least one memory unit [206] and at least one processor [208]. The user equipment [200] may further comprise of at least one antenna [212] and at least one on-boarding client module [210]. All the above said components of the user equipment [200] are connected to each other.

The memory unit [206] is coupled to transceiver [204], the application module [202], the on-boarding client module [210] and the processor [208]. The memory unit [206] is configured to store, in a database, a list of at least one sensor available at the user equipment [200]. The memory unit [206] is also configured to receive from the transceiver [204], and store the capability enquiry received from the network entity [300] at the user equipment [200] in a database. The memory unit [206] is also be configured to store the capability information transmitted to the network entity [300] in response to the capability enquiry.[200].

The processor [208] of the user equipment [200] is coupled to the transceiver [204], the application module [202], the on-boarding client module [210] and the memory unit [206]. The processor [208] is configured to identify at least one sensor available at the user equipment [200]. The processor [208] may identify at least one sensor available at the user equipment [200] in response to the capability enquiry received from the network entity [300].

In an instance of the present invention, the processor [208] may identify one or more types of sensors available at the user equipment [200] in response to the capability enquiry received from the network entity [300] For example, the processor [208] may categorise the at least one sensor at the user equipment [200], based on the mobility needs of the at least one sensor, as one of a stationary sensor, a nomadic sensor, a low mobile sensor and a full mobile sensor.

In an other example, the processor [208] may categorise the one ore more sensors at the user equipment [200], based on the application scenarios or different industrial verticals of the at least one sensor, as one of an agriculture sensor (Soil sensors, NPK sensors etc.), an environment monitoring sensor (weather sensors, wind force and direction sensors, moisture sensors etc.), etc. The present invention further encompasses that the sensor type can be either predefined, or obtained by the capability information message or may also be obtained via the application server.

In yet another instance of the present invention, the capability information of the user equipment may also include the frequencies supported by the user equipment. For example, the capability information may include that the user equipment supports very specific frequencies (Ex: Band 3 or Band 5 only).

The application module [202] is coupled to said antenna [212], the transceiver [204], the memory unit [206], the on-boarding client module [210] and the processor [208]. The application module [202] is configured to transmit the capability information to the network entity [300] of the wireless network via the transceiver [204]. The capability information comprises sensor capability information. In an instance of the present invention, the capability information may further comprise radio capability information of the user equipment.

The transceiver [204] of the user equipment [200] is coupled to said antenna [212], the memory unit [206], the application module [202], the on-boarding client module [210] and the processor [208]. The transceiver [204] is to be configured to transmit the capability information, received from the application module [202], to the network entity [300] via the antenna [212].

The on-boarding client module [210] is coupled to said antenna [212], the transceiver [204], the application module [202], the processor [208] and the memory unit [206]. The on-boarding client module [210] may be configured to communicate to an on-boarding server via the transceiver [204] while being in charge of the user equipment-specific on-boarding function.

Figure 3:
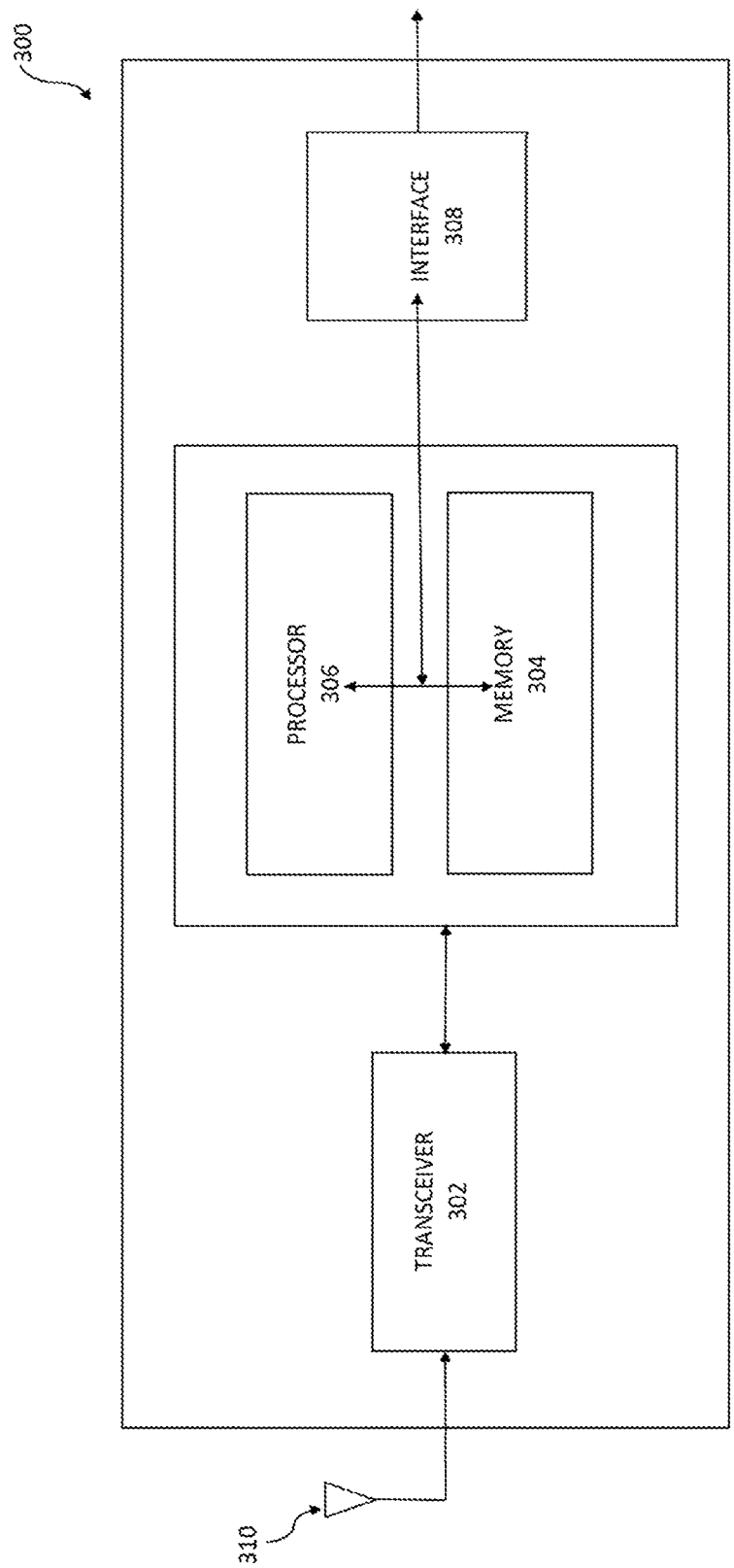
FIG. 3 illustrates an exemplary diagram of the network entity [300], in accordance with exemplary embodiments of the present disclosure.

FIG. 3 illustrates an exemplary diagram of the network entity [300], in accordance with exemplary embodiments of the present disclosure. As shown in FIG. 3, the wireless network entity [300] comprises at least one transceiver [302], at least one memory unit [304], at least one processor [306], at least one antenna [310] and at least one interface [308].

The transceiver [302] is coupled to the antenna [310], and the transceiver [302] is configured to transmit or receive the radio signals via said antenna [310]. Further said transceiver [302] may include at least one transmission unit and at least one receiving unit (not shown in the figure) and the transceiver [302] may be configured to transmit or receive the communication signals/data via wireless network entity [300] to user equipment [200] or vice versa.

For instance, the transceiver [302] of wireless network entity [300] may be configured to receive an initial context setup request for at least one user equipment [200] from the MME [101]. The transceiver [302] of wireless network entity [300] may also be configured to transmit a capability enquiry to the at least one user equipment [200]. The transceiver [302] of wireless network entity [300] may also be configured to receive a capability information from the at least one user equipment [200]. The transceiver [302] of wireless network entity [300] may also be configured to transmit the capability information received from the at least one user equipment [200] to the MME [101].

The processor [306] is connected to the memory unit [304], the transceiver [302] and the interface [308]. The processor [306] may be configured to process the initial context setup request for at least one user equipment [200] received from the MME [101] to create a capability enquiry for the at least one user equipment [200]. The processor [306] may be configured to execute functions/operations performed by each module/component of the wireless network entity [300]. The processor [306] as used herein may include, but not limited to, a processor or set of processors such as a microprocessor, a multi-core microprocessor, a digital signal processor, a collection of electronic circuits, or a combination thereof and may be configured to perform operations/functions as described herein. Further, the memory unit [304] is configured to store, in a database, the capability information received from the at least one user equipment [200].

Figure 4:
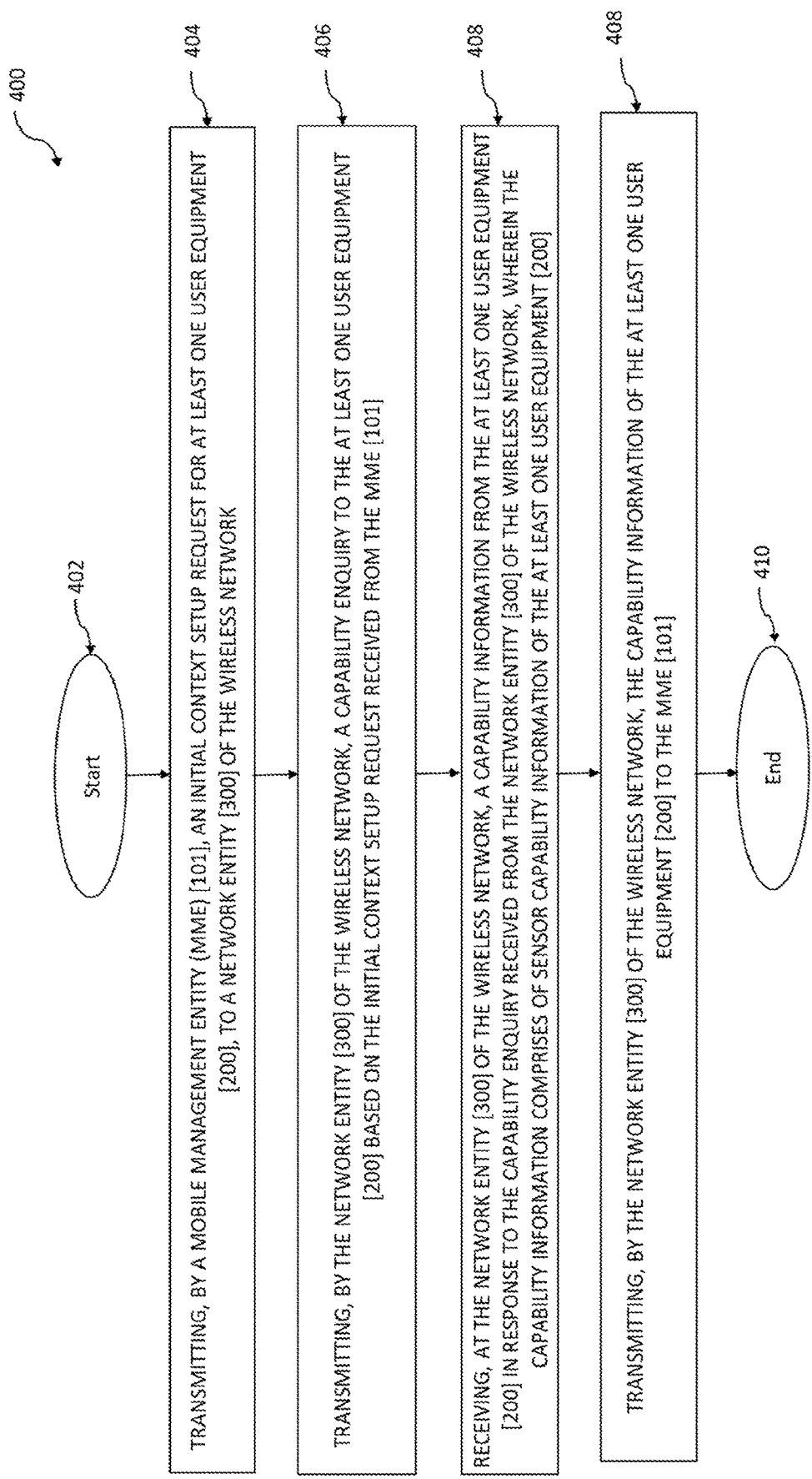
FIG. 4 illustrates an exemplary method flow diagram [400] depicting for identifying at least one sensor on at least one user equipment [200] connected to a wireless network, in accordance with exemplary embodiments of the present disclosure.

Referring to FIG. 4, an exemplary method flow diagram [400] depicting a method for identifying at least one sensor on at least one user equipment [200] connected to a wireless network, in accordance with exemplary embodiments of the present disclosure. The user equipment [200] may currently be connected to the network entity [300] over the NB-IoT channel.

The method [400] begins at step [402]. The method begins with the mobile management entity (MME) [101] transmitting, at step [404], an initial context setup request for at least one user equipment [200], to a network entity [300] of the wireless network. Accordingly, the method [400] encompasses that the initial context setup requests for at least one user equipment [200 is received at a network entity [300] of the wireless network.

Further, at step [408], the network entity [300] of the wireless network transmits a capability enquiry to the at least one user equipment [200] based on the initial context setup request received from the MME [101]. The method [400] encompasses that the network entity [300] processes the initial context request to create a capability enquiry for the at least one user equipment [200]. Accordingly, the method [400] encompasses that the at least one user equipment [200] receives a capability enquiry from the network entity [300].

Accordingly, the method encompasses that the at least one user equipment [200] transmits a capability information from the at least one user equipment [200] in response to the capability enquiry received from the network entity [300] of the wireless network. In an instance of the present invention, the method [400] encompasses that the at least one user equipment [200] provides a list of at least one sensor available at the at least one user equipment [200] in the sensor capability information. In another instance of the present invention, the capability information also comprises radio capability information for the at least one user equipment [200].

Furthermore, at step [410], the network entity [300] of the wireless network receives a capability information from the at least one user equipment [200] in response to the capability enquiry received from the network entity [300] of the wireless network. The capability information comprises of sensor capability information of the at least one user equipment [200]. In another instance of the present invention, the capability information also comprises radio capability information for the at least one user equipment [200].

Finally, at step [412], the network entity [300] of the wireless network transmits the capability information of the at least one user equipment [200] to the MME [101]. Accordingly, the present invention encompasses that the MME [10] receives the capability information of the at least one user equipment [200] from the network entity [300] of the wireless network.

Figure 5:
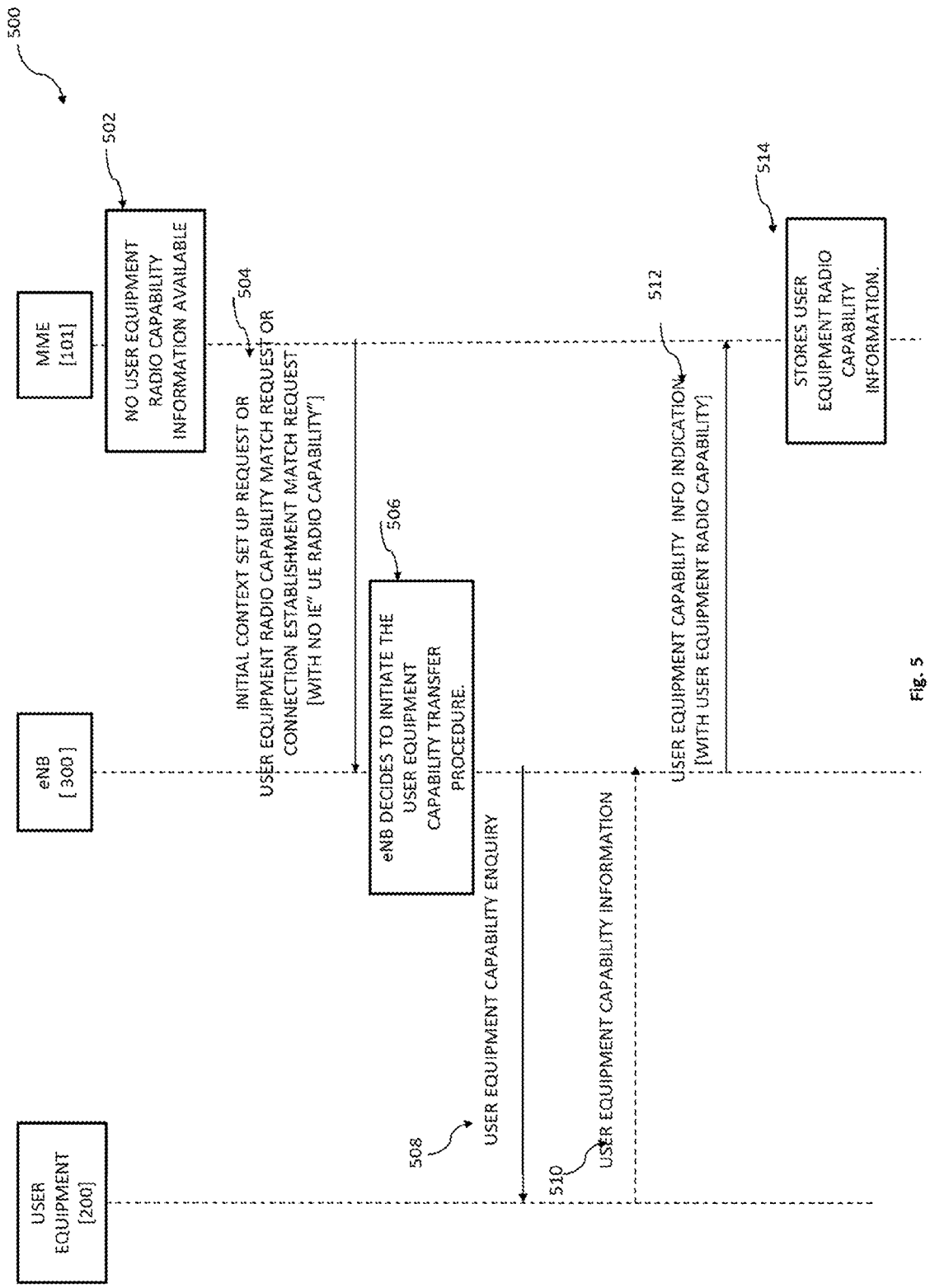
FIG. 5 illustrates an exemplary sequence block diagram [400] depicting for a method of acquiring radio capability information of the at least one user equipment [200], by the MME [10] via the network entity [300] of the wireless network, in accordance with exemplary embodiments of the present disclosure.

Referring to FIG. 5, illustrates an exemplary sequence block diagram [500] depicting a method for identifying radio capability of at least one user equipment [200] connected to a wireless network, in accordance with exemplary embodiments of the present disclosure.

For instance, the eNB may usually receive the radio capability information of a user equipment from the MME, through S1AP's initial context setup request (or a radio capability match request or a connection establishment indication message). In an event, at step [500], the MME does not have radio capability information of the user equipment, the MME while transmitting an S1AP initial context setup request (or a radio capability match request or a connection establishment indication message) to an eNB, the MME does not include the radio capability information of the user equipment as shown in step [502].

Accordingly, at step [504], the eNB is triggered to initiate an RRC capability transfer procedure towards the user equipment, to acquire the latest radio capability information from the user equipment. At step [508], upon the eNB receiving the radio capability information from the user equipment, the eNB forwards the radio capability information to the MME through S1AP's capability information indication message at step [512]. Subsequently, the MME stores radio capability information of the user equipment for subsequent provisioning of the eNB.

Thus, when the MME has acquired the latest radio capability information of a user equipment from the eNB, subsequently, while sending a S1AP Initial context setup request for a user equipment (or radio capability match request or connection establishment indication message) to the eNB, it includes the stored radio capability information of the user equipment in then S1Ap initial connection request. Accordingly, the eNB, uses the received radio capability of the user equipment for its internal processing and storage.

For instance, the radio capabilities of a user equipment for NB-IoT, includes, but is not limited to, AccessStratumRelease-NB, UE-category-NB, MultipleDRB, PDCP-parameters-NB, RLC-Parameters-NB, MAC-parameters-NB, Phy-layer-parameters-NB and RF-parameters-NB. The PDCP capability may include the supported RoHC profiles and the maximum number of RoHC context sessions. RLC capability may include the support for UM-RLC mode. MAC capability may include the support for DatalnactMon and rai. The Phy layer capability may include the support mainly for MultiTone and MultiCarrier. RF capability may include the support mainly for Power class of 20 dBm and 14 dBm, supported band list, et Further, in another instance of the present invention, the MME provisions the user equipment for reporting of data from the one or more sensors via a separate control channel messaging so that the network itself can route the data to the appropriate server collocated in the EPC.

In another instance of the present invention, the eNB may provision the sensor data reporting in measurement reporting configuration message itself. In another instance of the present invention, a new RRC or a NAS message can be defined to provision the reporting of sensor data. In yet another instance of the present invention, a new RRC message may be defined to send the provisioned sensor data to the eNodeB (eNB).

In yet another instance of the present invention, for the identified sensors, the present invention encompasses identifying a scheme of the data transmission for each of the identified sensor type, which allows the access network to act as a user equipment manager and as an IoT controller for the sensor network, thus, removing the overheads of having an additional application server to do the same.

Figure 6:
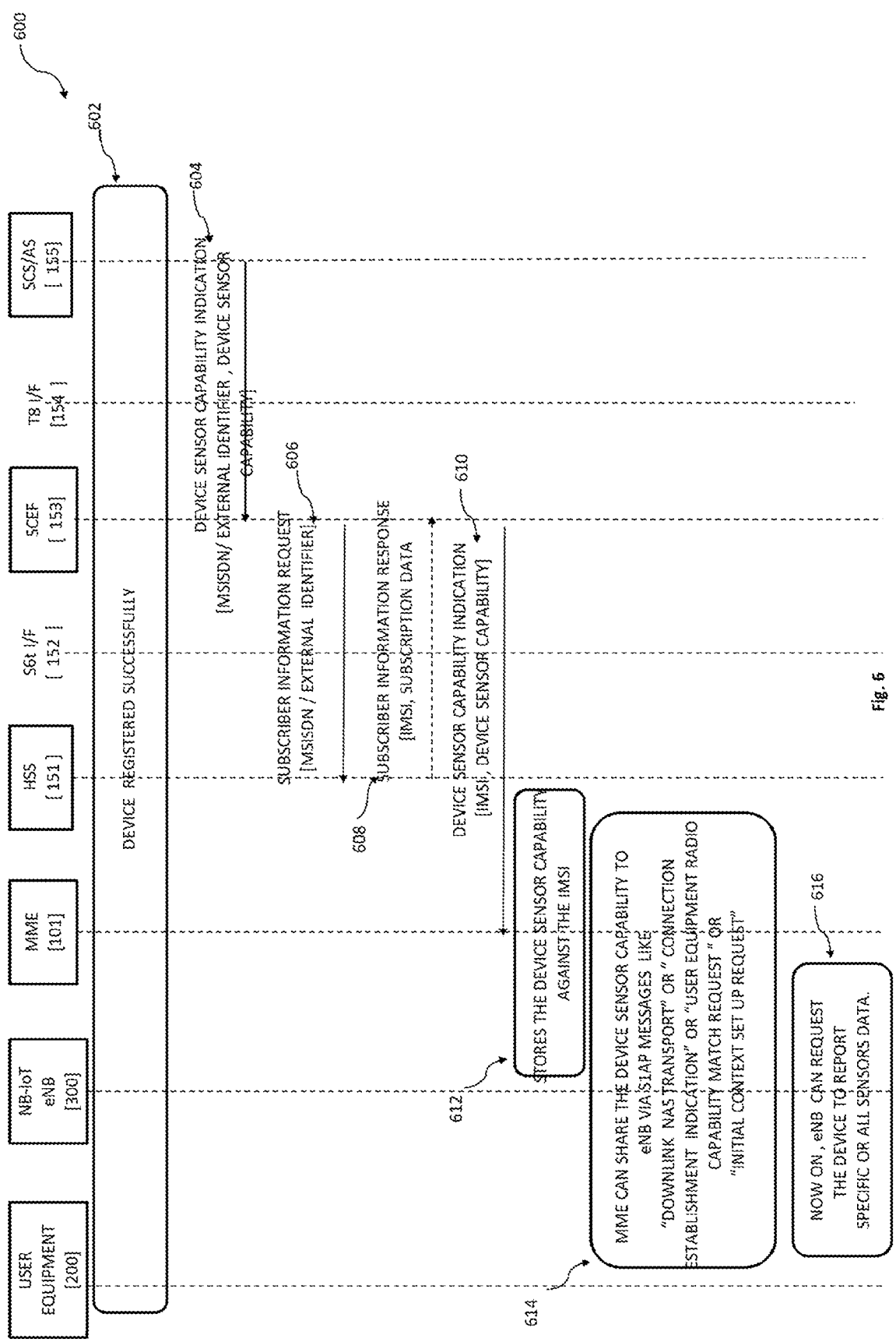
FIG. 6 illustrates an exemplary sequence block diagram [600] depicting a method for acquiring sensor type information by the MME [101] from an application server, via a SCEF interface, to identify the at least one sensor on the at least one user equipment [200] connected to the network entity [300] of the wireless network, in accordance with exemplary embodiments of the present disclosure.

Referring to FIG. 6 illustrates an exemplary sequence block diagram [600] depicting a method for acquiring sensor type information by the MME [101] from an application server, via a SCEF interface, to identify the at least one sensor on the at least one user equipment [200] connected to the network entity [300] of the wireless network, in accordance with exemplary embodiments of the present disclosure. For example, FIG. 6 shows the signal flow diagram when the "Sensor Type" information is pushed from the SCS or the Application server [155] to the MME [101]/eNB [300] via the SCEF [153] interface.

In operation, at step [600], the present invention encompasses that the application server possesses the capability to define new sensor types and the associated data types and periodicity in an NB-IoT system. After successful user equipment registration, at step [602], the SCS/AS [155] sends a user equipment sensor capability indication to SCEF [153] at step [604]. This user equipment sensor capability indication consists of MSISDN/external identifier, user equipment sensor capability, etc. Next, at step [606], the SCEF [153] sends subscriber information request to HSS [151].

Next, at step [608], after receiving the said request, HSS [151] returns subscriber information response. Further, at step [610], the SCEF [153] transmits user equipment sensor capability indication to the MME [101]. At step [612], the MME [101] stores the user equipment sensor capability against the IMSI of the user equipment. Next, the MME [101] shares the user equipment sensor capability to the eNB [300] via S1AP messages, for example, "DOWNLINK NAS TRANSPORT" or "CONNECTION ESTABLISHMENT INDICATION" or "USER EQUIPMENT RADIO CAPABILITY MATCH REQUEST" or "INITIAL CONTEXT SET UP REQUEST" as shown in step [614]. Finally, the eNB [300], at step [616], may request the user equipment to report specific or all sensors data as shown in step [616].

Figure 7:
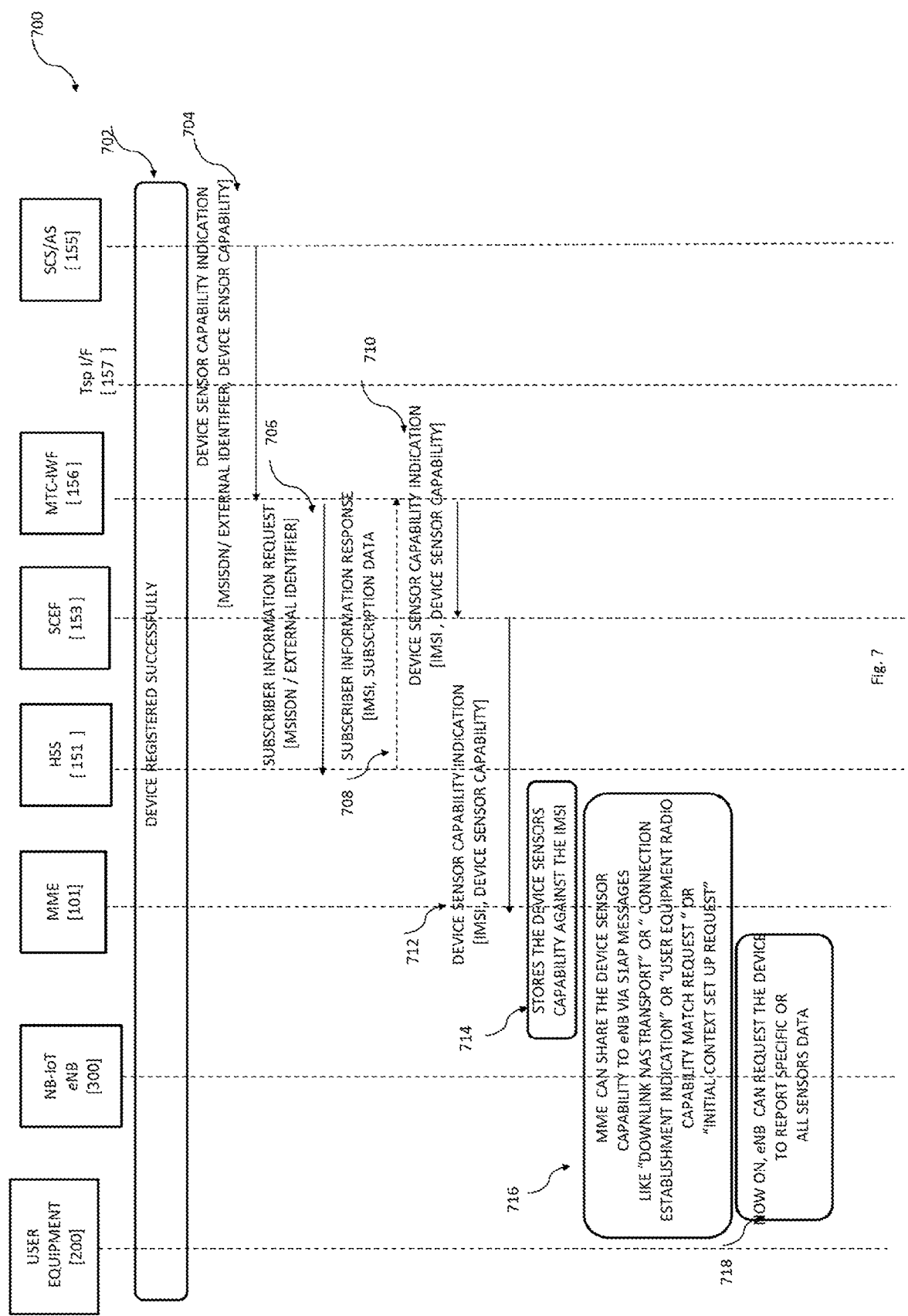
FIG. 7 illustrates an exemplary sequence block diagram [700] depicting a method for acquiring sensor type information by the MME [101] from an application server, via a MTC-IWF interface, to identify the at least one sensor on the at least one user equipment [200] connected to the network entity [300] of the wireless network, in accordance with exemplary embodiments of the present disclosure.

FIG. 7 illustrates an exemplary sequence block diagram [700] depicting a method for acquiring sensor type information by the MME [101] from an application server [155], via a MTC-IWF interface [156], to identify the at least one sensor on the at least one user equipment [200] connected to the network entity [300] of the wireless network, in accordance with exemplary embodiments of the present disclosure. After successful device registration as shown in step

[702], the SCS/AS [155] sends a device sensor capability indication to MTC-IWF [156] at step [704]. This device sensor capability indication consists of MSISDN/external identifier, device sensor capability. Next, the MTC-IWF [156] transmits a subscriber information request to the HSS [151] as shown in step [706].

Upon receiving the said request, HSS [151] returns the subscriber information response at step [708]. Next, at the step [710], MTC-IWF [156] transmits device sensor capability indication to the SCEF [153]. Further, at step [712], the SCEF [153] transmits device sensor capability indication to MME [101]. Next, at step [714], the MME [101] stores the device sensor capability against the IMSI of the user equipment [200]. Next, the MME [101] can share the device sensor capability to eNB [300] via S1AP messages, for example, "DOWNLINK NAS TRANSPORT" or "CONNECTION ESTABLISHMENT INDICATION" or "USER EQUIPMENT RADIO CAPABILITY MATCH REQUEST" or "INITIAL CONTEXT SET UP REQUEST" as shown in step [716]. Finally, the eNB [300] can request the device to report specific or all sensors data as shown in step [718].

Figure 8:
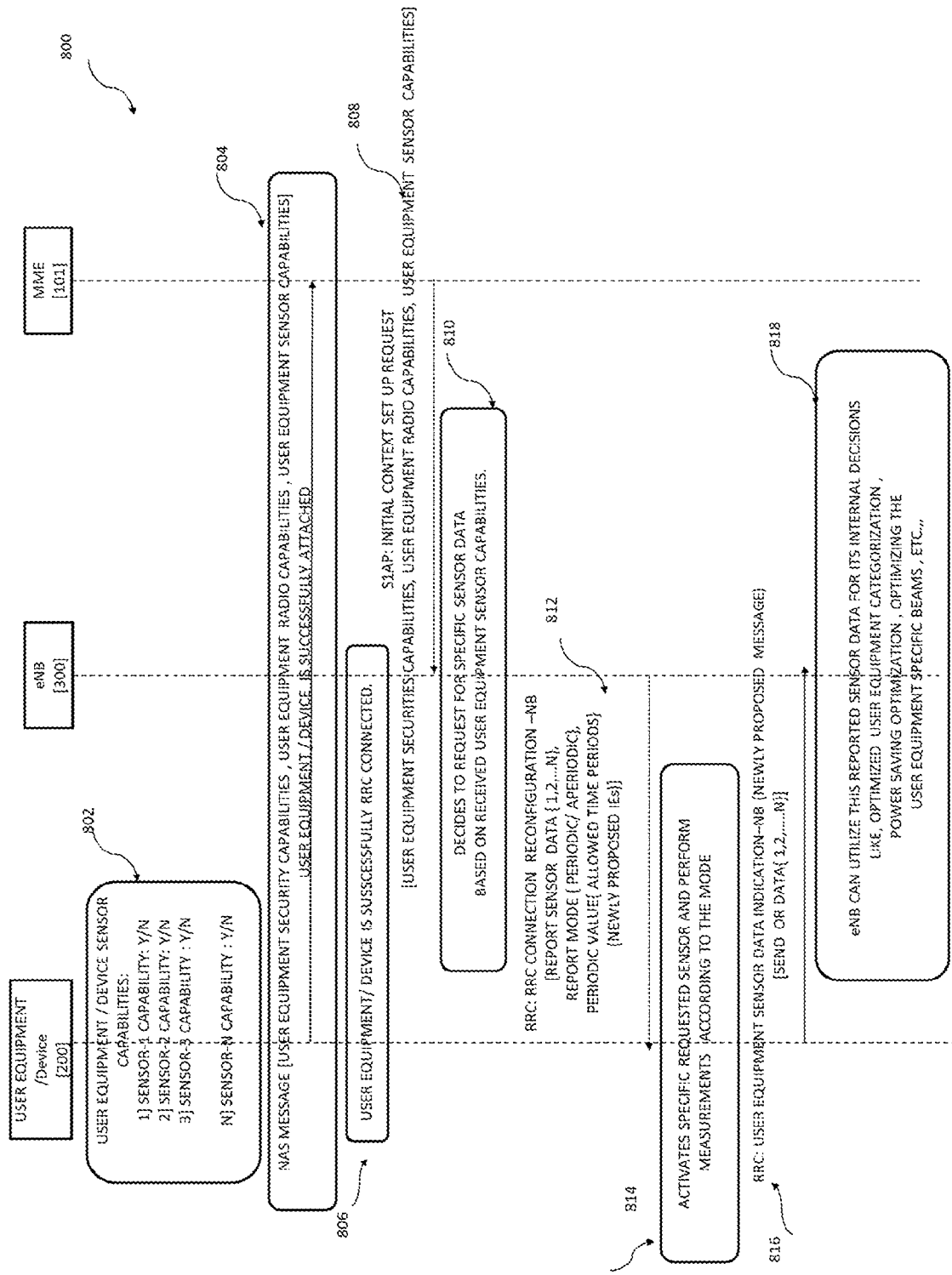
FIG. 8 illustrates an exemplary sequence block diagram [800] depicting a method for acquiring sensor type information by the MME [101], using a RRC connection request, for identifying at least one sensor on at least one user equipment [200] connected a wireless network, in accordance with exemplary embodiments of the present disclosure.

Referring to FIG. 8, illustrates an exemplary sequence block diagram [800] depicting a method for acquiring sensor type information by the MME [101], using a RRC connection request, for identifying at least one sensor on at least one user equipment [200] connected a wireless network, in accordance with exemplary embodiments of the present disclosure. It shows an exemplary flowchart illustrative of a set-up of the mechanism of the network querying the device for sensor capability, the device reporting such a capability and the network provisioning the reporting of sensor data. At step [802], user equipment [200] extends capability information to cover sensor information. Next, at step [804], the user equipment [200] transmits a NAS message to the MME [101]. The NAS message includes a user equipment security capability, a user equipment sensor capability and/or a user equipment radio capability. Thus, at step [806], the user equipment [200] is RRC_connected state where the user equipment [200] may receive or send data directly over the wireless network.

Further, at step [808], the eNB [300] may receive the user equipment radio capability information from the MME [101], through S1AP's initial context setup request (or user equipment radio capability match request or connection establishment indication message). Based on the received user equipment sensor capabilities, the eNB [300] decides to request for specific sensor data at step [810], which in turn triggers the eNB [300] to initiate a RRC capability transfer procedure to the user equipment [200] to acquire the latest user equipment capability information from the user equipment [200] at step [812].

Thus, the user equipment [200] activates the specific requested sensor types and performs measurement of the sensors according to the mode as shown in step [814]. Next, at step [816], the user equipment [200] initiates transmission of user equipment sensor data to the eNB [300] over the RRC connection. Finally, at step [818], the eNB [300] receives the reported sensor data for its internal decisions like optimized user equipment categorization, power-saving optimization, optimizing the user equipment specific beams etc.

Figure 9:
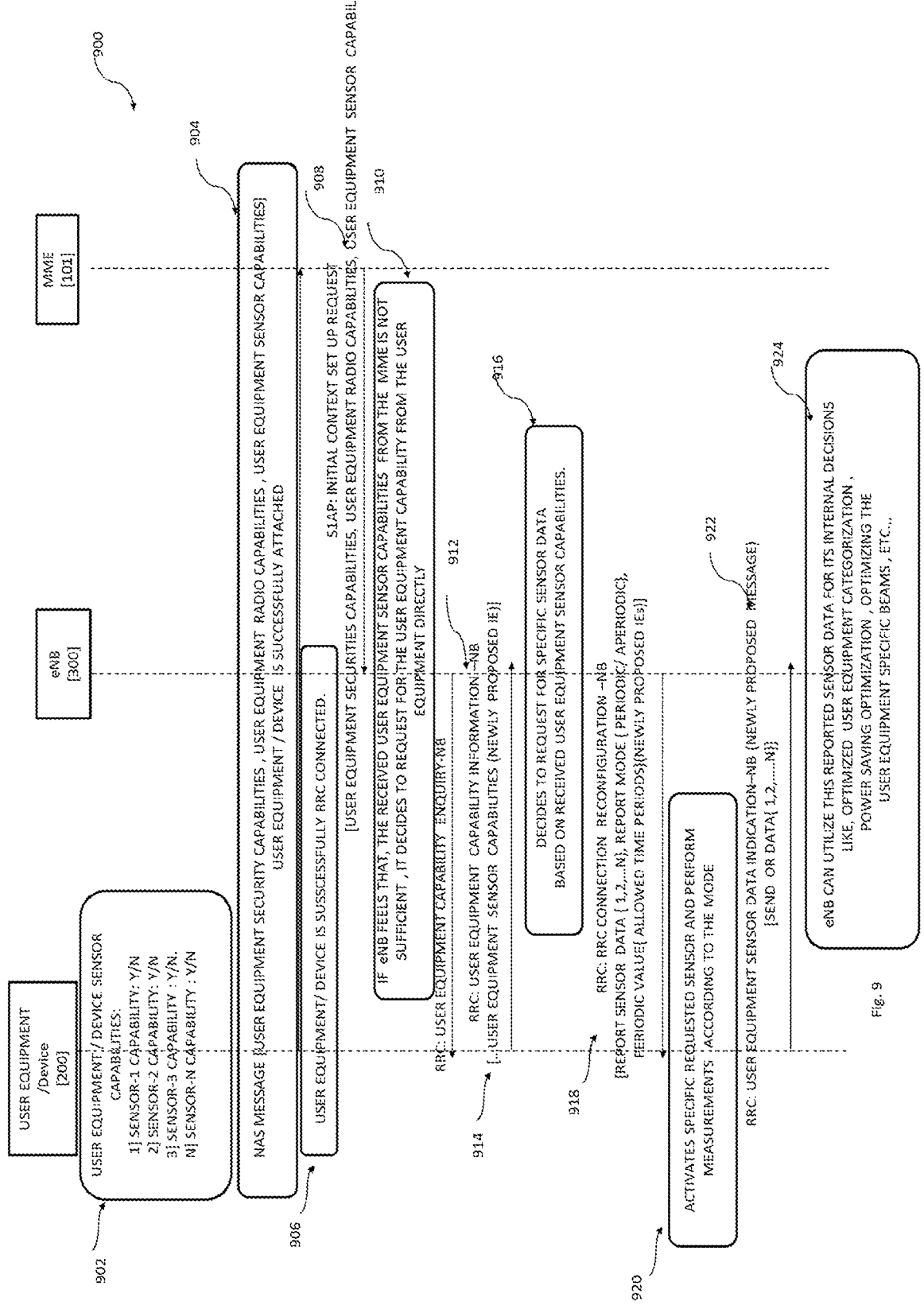
FIG. 9 illustrates an exemplary sequence block diagram [900] depicting a method for acquiring sensor type information by the MME [101], using a modified RRC connection request, for identifying at least one sensor on at least one user equipment [200] connected a wireless network, in accordance with exemplary embodiments of the present disclosure.

Referring to FIG. 9, illustrates an exemplary sequence block diagram [900] depicting a method for acquiring sensor type information by the MME [101], using a modified RRC connection request, for identifying at least one sensor on at least one user equipment [200] connected a wireless network, in accordance with exemplary embodiments of the present disclosure. It shows an exemplary flowchart illustrative of a set-up of the mechanism of the network querying the device for sensor capability, the device reporting such a capability and the network provisioning the reporting of sensor data. At step [902], the user equipment [200] extends capability information including sensor information. Next, at step [904], the user equipment [200] transmits a NAS message to MME [101], where such NAS message includes at least one of a user equipment security capabilities, a user equipment sensor capabilities and a user equipment radio capabilities. Thus, at step [906], the, user equipment [200] is in RRC_connected state. shown in step [906]. In the RRC_connected state, the devices can receive or send data directly.

Further, at step [908], the eNB [300] receives the user equipment radio capability information from the MME [101], through S1AP's initial context setup request (or user equipment radio capability match request or connection establishment indication message). In next step [910], the eNB [300] takes decision if the received user equipment sensor capabilities from MME [101] is not sufficient, then the eNB[300] directly links the user equipment [200] with the MME [101]. At step [912], the eNB[300] enquires user equipment capability from the user equipment[200]. The user equipment [200] receives the request and responds to the eNB[300] with an RRC user equipment connected information at step [914].

Next, at step [916], based on the received user equipment sensor capabilities, the eNB [300] decides to request for specific sensor measurement data. At step [918], the eNB [300] is triggered to initiate the RRC user equipment capability transfer procedure towards the user equipment [200] to acquire the latest user equipment capability information from the user equipment [200]. In this manner, the user equipment [200] activates the specific requested sensor and starts performing a measurement according to the mode as shown in step [920]. In the next step [922], the user equipment [200] initiates an RRC connection to the eNB [300] which consists of user equipment sensor measurement data indication. Finally, at step [924], the eNB [300] stores and utilises the reported sensor data for its internal decisions like optimized user equipment categorisation, power-saving optimization, optimizing the user equipment specific beams etc.

Figure 10:
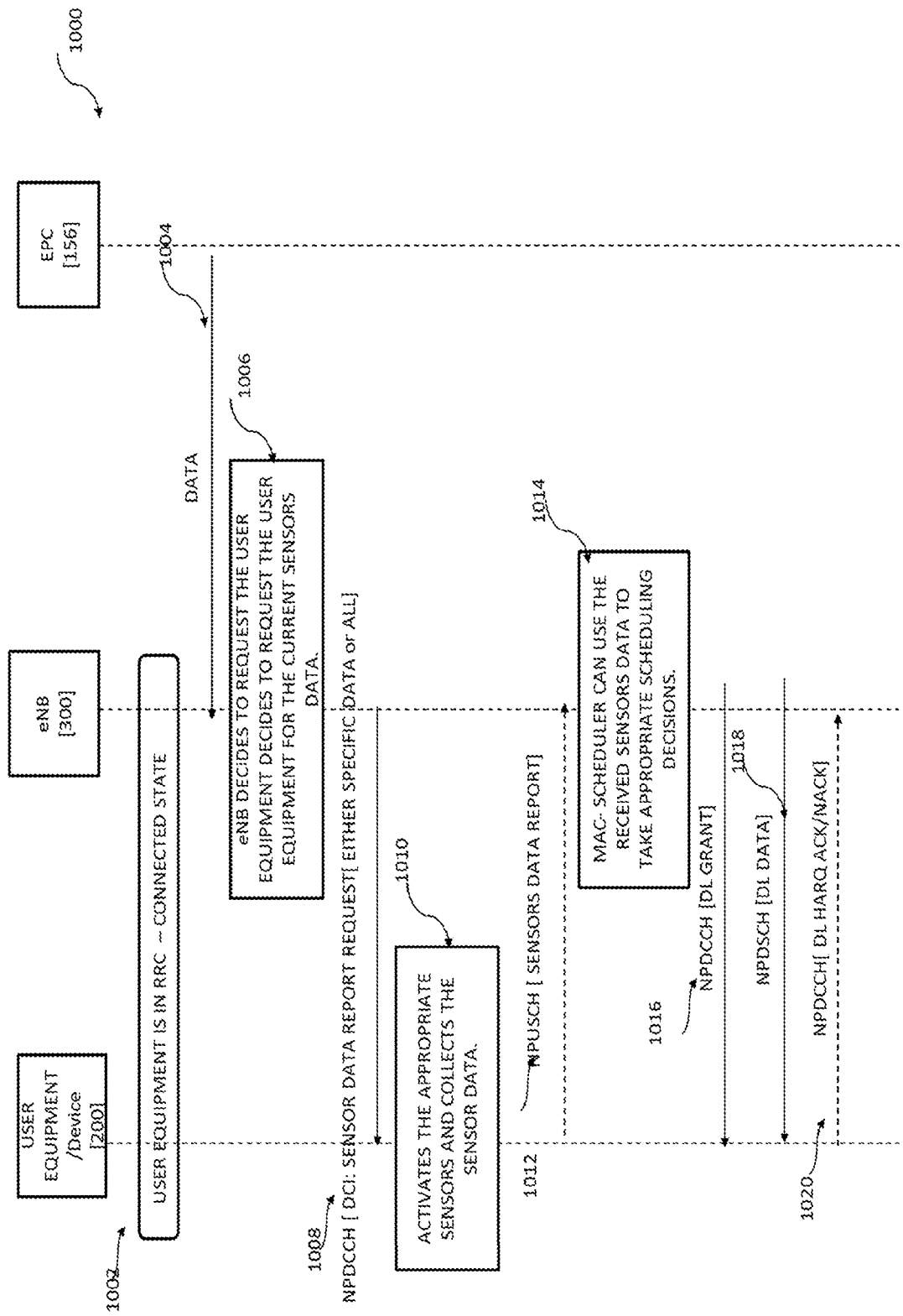
FIG. 10 illustrates an exemplary sequence block diagram [1000] depicting a method for reporting data of the at least one sensor of the user equipment [200] to the MME [101] by a MAC scheduler, in accordance with exemplary embodiments of the present disclosure.

Referring to FIG. 10, illustrates an exemplary sequence block diagram [1000] depicting a method for reporting data of the at least one sensor of the user equipment [200] to the MME [101] by a MAC scheduler, in accordance with exemplary embodiments of the present disclosure. It illustrates an exemplary flowchart for set-up of the mechanism of the user equipment [200] sensors data capabilities being received from MAC scheduler. Firstly, the user equipment [200] is connected to the eNB in RRC connected state as shown in step [1002].

Upon successful connection, at step [1004], the EPC [156] transmits request for current sensor data to eNB[300]. In next step [1006], the eNB [300] decides to request the user equipment [200] for current sensor data. The present invention encompasses that the for the eNB [300] to receive data transmitted by the user equipment [200], the eNB [300] can first request the user equipment[200] to send the current readings of some specific sensors or all the supported sensors based on the user equipment's capabilities, by adding the sensor data report request in the DCI and also allocating some grant for reporting the sensor data. This DCI is sent to user equipment [200] through NPDCCH as shown in step[1008].

Next, at step [1010], the user equipment [200] activates the appropriate sensors and collects the sensor data. The user equipment [200], after receiving the request through NPDCCH, activates all the requested sensors to report the sensor data. After receiving the sensor data, at step [1012], the user equipment [200] forwards it to the eNB [300] via NPUSCH which the MAC-Scheduler can utilize while taking the decision for scheduling for the DL data to the user equipment [200] as also shown in step [1014]. The MAC-Scheduler may use this sensor data while giving dedicated grants to the user equipment [200].

Once the MAC-scheduler has made decisions based on the sensor data, it provides the grant for the DL data transmission as shown in step [1016] and shall subsequently, follow the standard procedures for data transmission, as shown in step s [1018] and [1020]. The network then will route the data to the appropriate destination server based on apriori knowledge or through an APN/destination address indication. This helps in achieving an early transmission mechanism and provides a data path for a sensor user equipment. The network can schedule the measurement report periodically and thus restrict the amount of information that the user equipment can send.

Figure 11:
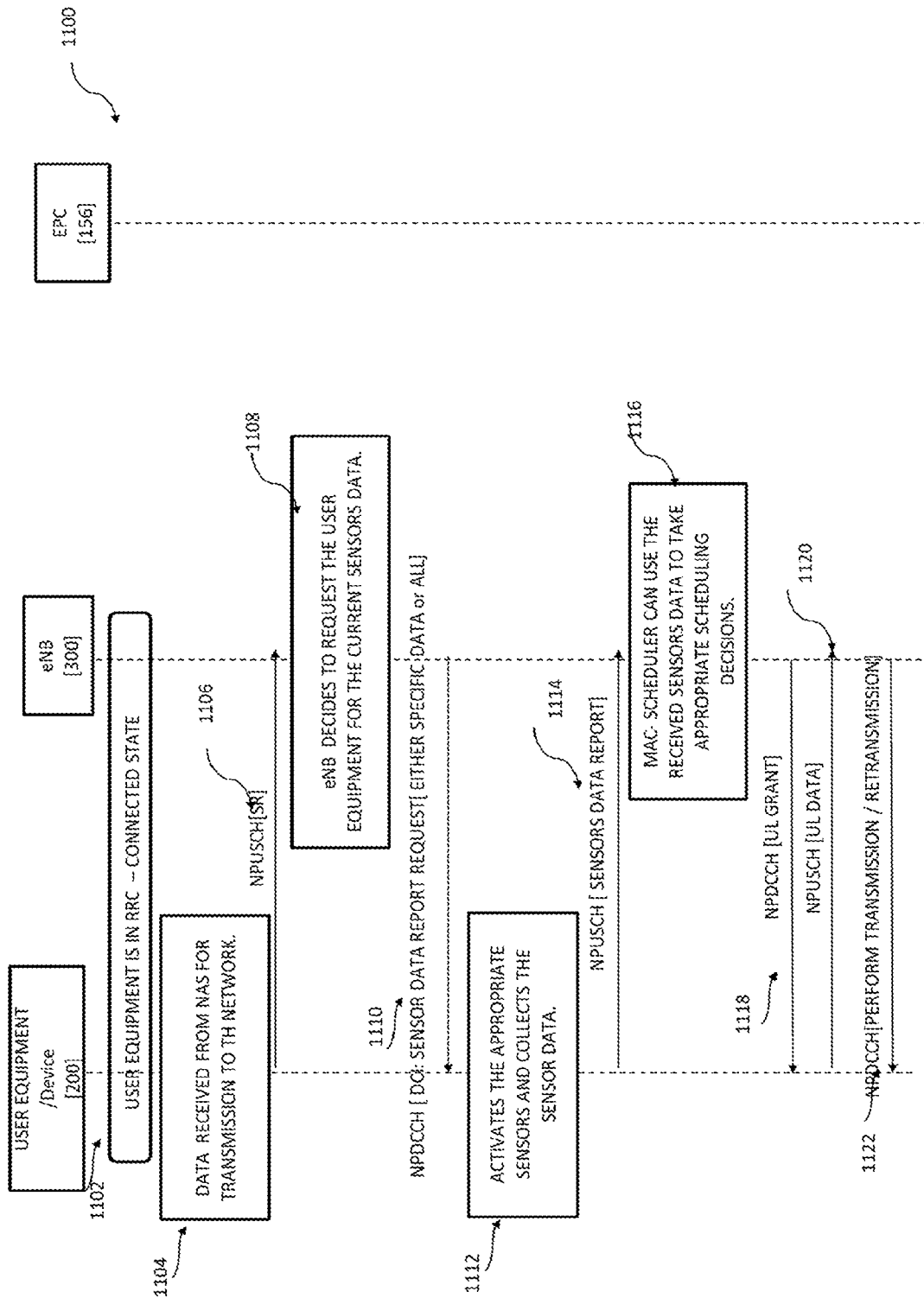
FIG. 11 illustrates an exemplary sequence block diagram [1100] depicting a method for reporting data of the at least one sensor of the user equipment [200] to the MME [101] by a MAC scheduler, in accordance with exemplary embodiments of the present disclosure.

Referring to FIG. 11, illustrates an exemplary sequence block diagram [1100] depicting a method for reporting data of the at least one sensor of the user equipment [200] to the MME [101] by a MAC scheduler, in accordance with exemplary embodiments of the present disclosure.

Upon successful connection, at step [1102], the user equipment [200] receives NAS data from the wireless network. Next, at step [1108], the eNB [300] decides to request the user equipment [200] for current sensor data via an NPDCCH request. Next, at step [1112], the user equipment [200] activates the appropriate sensors and collects the sensor data. The user equipment [200], after receiving the request through NPDCCH, activates all the requested sensors to report the sensor data. After receiving the sensor data, at step [1012], the user equipment [200] forwards it to the eNB [300] via NPUSCH which the MAC-Scheduler can utilize while taking the decision for scheduling for the DL data to the user equipment [200] as also shown in step [1014]. The MAC-Scheduler may use this sensor data while giving dedicated grants to the user equipment [200].

Figure 12:
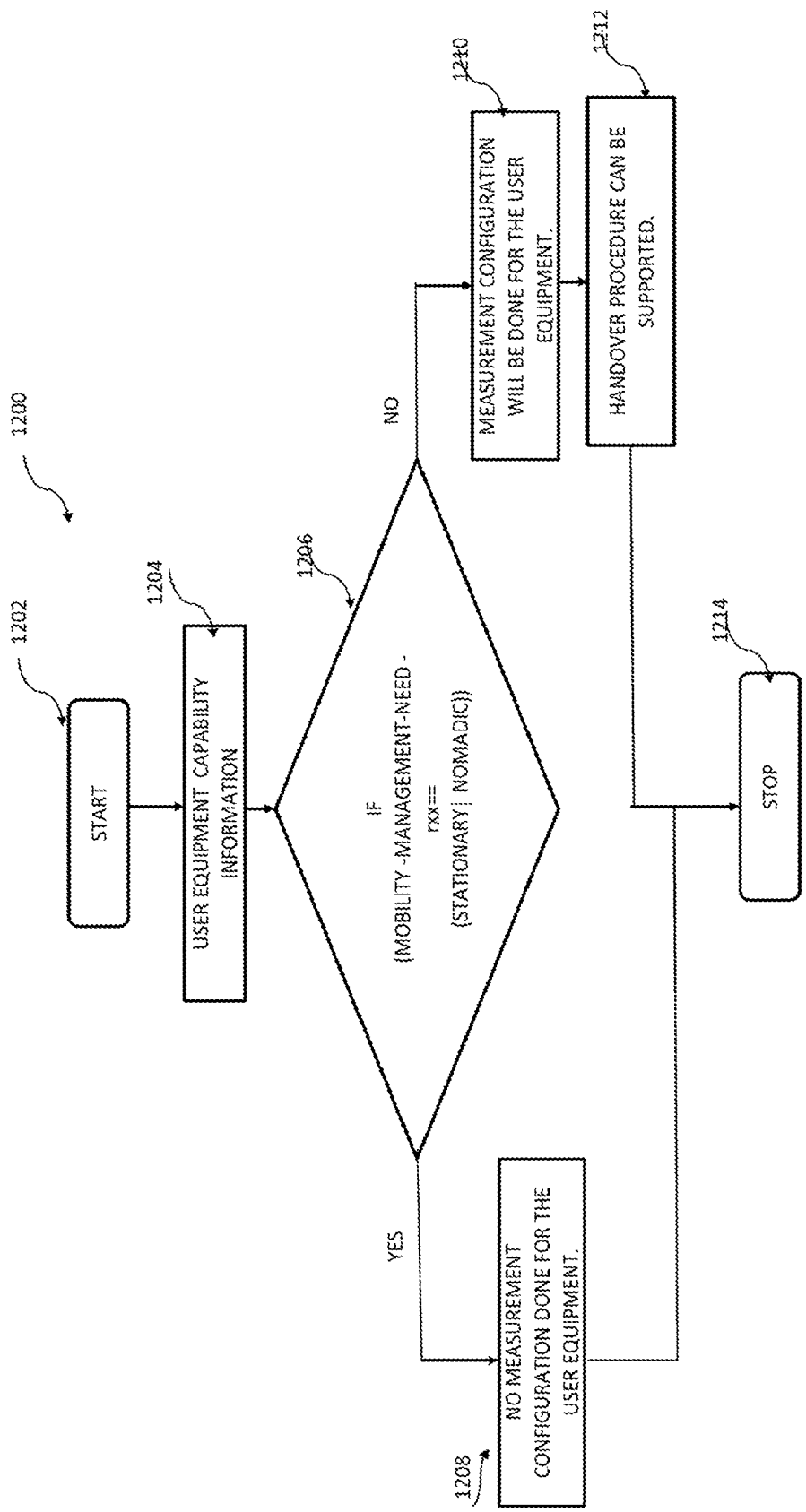
FIG. 12 illustrates an exemplary sequence block diagram [1200] depicting an implementation of the method of identifying at least one sensor of the user equipment [200] connected to the wireless network in handover, in accordance with exemplary embodiments of the present disclosure.

Referring to FIG. 12, illustrates an exemplary sequence block diagram [1200] depicting an implementation of the method of identifying at least one sensor of the user equipment [200] connected to the wireless network in the handover, in accordance with exemplary embodiments of the present disclosure. For instance, the use of sensor capability information, when the eNB receives the UE capability information either from the MME or from the user equipment itself, it first checks the IE mobility-management-need-rxx of the user equipment and based on its value, the eNB may decide whether to configure the measurement reporting for Intra-Freq or Inter-Freq or Inter-RAT measurement for the user and consequently, the corresponding handover procedures may be triggered.

In other exemplary implementation of the present invention, the method of the present invention may be implemented in "Cell Barring" for a set of sensor types, where the same may be published in a broadcast message or may be indicated to a NB-IoT sensor in a sensor-specific message.

In another exemplary implementation of the present invention, the method of the present invention may be implemented in signal reception improvement. For instance, two user equipments connected to the eNB (say E1 and E2), assuming that the eNB is unaware of the sensor capabilities of the user equipment, and so, the eNB is not aware that E1 is at the altitude of 3 meters and E2 is at 8 meters. When the eNB is transmitting, while E1 may be well within the main beam of the eNB and SNR of E1 will be good, but, E2 may be slightly away from the main beam of the eNB due to its altitude and hence it's experienced SNR will be slightly bad. Due to this issue, the experienced QoS/QoE will be relatively lower for E2, when compared with that of E1.

This issue may be resolved efficiently, by applying the solution of the present invention, that each of the user equipments E1 and E2 share their DISTANCE MEASUREMENT capabilities with the eNB, and accordingly, E1 and E2 transmit the altitude measurements to the eNB, to aware the eNBof the altitudes of the user equipments. Accordingly, upon knowing the altitude of the user equipments, by way of the user equipments reporting their altitude measurement data to the eNB, the eNB may create separate spatial beam for each of the user equipment and tilt their individual beams vertically to suit according to the reported altitude measurements of E1 and E2. This way, the E2 shall also experience higher SINR and hence, shall result, in higher QoS/QoE.

Therefore, as is evident from the above method, the user equipment [200] can easily identify at least one sensor on at least one user equipment [200] connected to a wireless network. Thus, the solution of the present invention provides to bring in awareness of sensor type into the network architecture and thus helping achieve a close integration of the sensor type and the NB-IoT network. The present invention also encompasses dynamically adding new sensor types and control the sensor data transmission by configuring the collection and rate of data transmission via a control channel. While the implementation of the solution of the present invention has been discussed to a very few usages including, handovers, cell barring, signal reception, the invention may also be used in many other applications that may be known to a person skilled in the art, all of which are objectives of the present invention.

The interface, module, memory, database, processor and component depicted in the figures and described herein may be present in the form of a hardware, a software and a combination thereof. The connection shown between these components/module/interface in the system [100] are exemplary, and any components/module/interface in the system [100] may interact with each other through various logical links and/or physical links. Further, the components/module/interface may be connected in other possible ways.

Though a limited number of servers, gateways, user equipment, wireless network, interface, module, memory, database, processor and component have been shown in the figures, however, it will be appreciated by those skilled in the art that the overall system of the present invention encompasses any number and varied types of the entities/elements such as servers, gateways, user equipment, wireless network, interface, module, memory, database, processor and component.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for identifying at least one sensor on at least one user equipment in a wireless network, the method comprising:
   transmitting, by a mobile management entity (MME), an initial context setup request for at least one user equipment, to a network entity of the wireless network;
   transmitting, by the network entity of the wireless network, a capability enquiry to the at least one user equipment based on the initial context setup request received from the MME;
   receiving, at the network entity of the wireless network, capability information from the at least one user equipment in response to the transmitting of the capability enquiry to the at least one user equipment, wherein the capability information comprises radio capability information of the at least one user equipment, and at least one of: sensor capability information of the at least one user equipment, or sensor type information indicating a type of at least one sensor available at the at least one user equipment, and wherein the radio capability information comprises at least one of: Access Stratum Release parameters, multiple Data Radio Bearer (ORB) parameters, Packet Data Convergence Protocol (PDCP) parameters, Radio Link Control (RLC) parameters, Medium Access Control (MAC) parameters, physical layer parameters, or Radio Frequency (RF) parameters; and
   transmitting, by the network entity of the wireless network, the capability information of the at least one user equipment to the MME.

2. The method as claimed in claim 1, wherein the network entity of the wireless network comprises at least one of a base station controller, a base transceiver station, a cell site, a Node B, an eNodeB (eNB) or a radio network controller.

3. The method as claimed in claim 1, further comprising:
   transmitting, by the MME, a request for information for the at least one sensor of the at least one user equipment to the at least one user equipment via the network entity of the wireless network, the request for information being based on the sensor capability information received from the network entity of the wireless network; and
   receiving, at the MME, at least one status parameter for the at least one sensor of the at least one user equipment, from the at least one user equipment via the network entity of the wireless network, in response to the request for information.

4. The method as claimed in claim 1, wherein, upon receipt of the capability information of the at least one user equipment, the MME further transmits an inquiry for data collected by a type of the at least one sensor present at the user equipment.

5. The method as claimed in claim 1, further comprising:
   storing, at the MME, the capability information received from the network entity of the wireless network and at least one user equipment identifier of the at least one user equipment in a memory.

6. A network entity of a wireless network, comprising:
   a receiver configured to receive an initial context setup request from a mobile management entity (MME) in the wireless network; and
   a transmitter configured to transmit a capability enquiry to at least one user equipment based on the received initial context setup request,
   wherein the receiver is further configured to receive capability information of the at least one user equipment from the at least one user equipment, wherein the capability information comprises radio capability information of the at least one user equipment, and at least one of: sensor capability information of the at least one user equipment, or sensor type information indicating a type of at least one sensor available at the at least one user equipment, and wherein the radio capability information comprises at least one of: Access Stratum Release parameters, multiple Data Radio Bearer (ORB) parameters, Packet Data Convergence Protocol (PDCP) parameters, Radio Link Control (RLC) parameters, Medium Access Control (MAC) parameters, physical layer parameters, or Radio Frequency (RF) parameters, and
   wherein the transmitter is further configured to transmit the received capability information of the at least one user equipment to the MME.

7. The network entity of a wireless network as claimed in claim 6, wherein the network entity of the wireless network is a base station controller, a base transceiver station, a cell site, a Node B, an eNodeB (eNB) or a radio network controller.

8. The network entity of a wireless network as claimed in claim 6, further comprising:
   a processor coupled to the receiver and the transmitter; and
   an interface coupled to the processor.

9. The network entity of a wireless network as claimed in claim 8, wherein the network entity is connected to the MME via the interface.

10. The network entity of a wireless network as claimed in claim 6, wherein the receiver is further configured to receive, from the at least one user equipment, at least one status parameter for the at least one sensor of the at least one user equipment.

11. The network entity of a wireless network as claimed in claim 10, wherein the network entity is configured to adjust a beam tilt based on the at least one status parameter for the at least one sensor of the at least one user equipment and the received capability information.

12. User equipment in a wireless network, comprising:
   a receiver configured to receive, from a network entity of the wireless network, a capability enquiry; and
   a transmitter configured to transmit, to the network entity of the wireless network, capability information of the user equipment in response to receipt of the capability enquiry,
   wherein the capability information comprises radio capability information for the user equipment, and at least one of: sensor capability information of the user equipment, or sensor type information indicating a type of at least one sensor available at the user equipment, and
   wherein the radio capability information comprises at least one of: Access Stratum Release parameters, multiple Data Radio Bearer (ORB) parameters, Packet Data Convergence Protocol (PDCP) parameters, Radio Link Control (RLC) parameters, Medium Access Control (MAC) parameters, physical layer parameters, and Radio Frequency (RF) parameters.

13. The user equipment as claimed in claim 12, wherein the capability enquiry is based on an initial context setup request received by the network entity from a mobile management entity (MME).

14. The user equipment as claimed in claim 12, wherein the capability information of the user equipment received by the network entity of the wireless network is further transmitted to a mobile management entity (MME).

15. The user equipment as claimed in claim 12, wherein the network entity of the wireless network comprises at least one of a base station controller, a base transceiver station, a cell site, a Node B, an eNodeB (eNB) or a radio network controller.

* * * * *